(12) United States Patent
Graves et al.

(10) Patent No.: US 10,489,482 B1
(45) Date of Patent: Nov. 26, 2019

(54) GAUSSIAN ELIMINATION VIA A VECTOR MATRIX MULTIPLICATION ACCELERATOR

(71) Applicant: HEWLETT PACKARD ENTERPRISE DEVELOPMENT LP, Houston, TX (US)

(72) Inventors: Catherine Graves, San Francisco, CA (US); John Paul Strachan, San Carlos, CA (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 0 days.

(21) Appl. No.: 15/995,505

(22) Filed: Jun. 1, 2018

(51) Int. Cl.
| | |
|---|---|
| G06F 17/16 | (2006.01) |
| G06G 7/32 | (2006.01) |
| G06G 7/16 | (2006.01) |
| G06F 17/12 | (2006.01) |

(52) U.S. Cl.
CPC ............. *G06F 17/16* (2013.01); *G06F 17/12* (2013.01); *G06G 7/16* (2013.01); *G06G 7/32* (2013.01)

(58) Field of Classification Search
CPC ............... G06F 7/32; G06F 17/12; G06F 7/16
USPC ......................................................... 708/520
See application file for complete search history.

(56) References Cited

U.S. PATENT DOCUMENTS

| | | | |
|---|---|---|---|
| 7,089,159 B2 | 8/2006 | Hachiya | |
| 9,715,655 B2 | 7/2017 | Wu et al. | |
| 9,910,827 B2 | 3/2018 | Muralimanohar et al. | |
| 2014/0143194 A1* | 5/2014 | Yoon | G06N 3/08 706/25 |
| 2014/0172937 A1* | 6/2014 | Linderman | G06G 7/16 708/607 |

FOREIGN PATENT DOCUMENTS

| | | |
|---|---|---|
| DE | 102013223813 | 5/2015 |
| WO | WO-2017127086 | 7/2017 |

OTHER PUBLICATIONS

Agarwal, S. et al.; "Energy Scaling Advantages of Resistive Memory Crossbar Based Computation and Its Application to Sparse Coding"; Jan. 6, 2016; 13 pages.
Moussa, S. et al.; "FPGA implementation of floating-point complex matrix inversion based on GAUSS-JORDAN elimination"; 2013; 4 pages.

\* cited by examiner

*Primary Examiner* — Tan V Mai
(74) *Attorney, Agent, or Firm* — McDermott Will & Emery

(57) ABSTRACT

Methods for solving systems of linear equations via utilization of a vector matrix multiplication accelerator are provided. In one aspect, a method includes receiving, from a controller and by the vector matrix multiplication accelerator, an augmented coefficient matrix. The method also comprises implementing Gaussian Elimination using the vector matrix multiplication accelerator by: monitoring, by a register in at least one swap operation, a row order of the augmented coefficient matrix when a first row is swapped with a second row of the augmented coefficient matrix, delivering, by the controller in at least one multiply operation, an analog voltage to a desired row of the augmented coefficient matrix to produce a multiplication result vector, and adding, in at least one add operation, the first row to another desired row of the augmented coefficient matrix to produce an add result vector. Systems and circuits are also provided.

20 Claims, 4 Drawing Sheets

GAUSSIAN ELIMINATION VIA A VECTOR MATRIX MULTIPLICATION ACCELERATOR

TECHNICAL FIELD

The present disclosure generally relates to solving linear systems of equations, and more specifically relates to accelerating Gaussian elimination via a vector matrix multiplication accelerator.

BACKGROUND

Many computer-based applications used for, for example, creating Boolean satisfiability filters, signal and image processing, materials science and fluid dynamics simulations, and computational finance require solving linear systems of equations. One approach to solving these linear systems of equations is to implement Gaussian elimination. Gaussian elimination, also known as row reduction, involves a sequence of operations performed on a corresponding matrix of coefficients. Row operations, such as swapping two rows, multiplying a row by a non-zero number, and adding a multiple of one row to another row, are performed on the corresponding matrix of coefficients until the matrix is in row echelon form. Accordingly, to solve a system of n equations for n unknowns, requires $n(n+1)/2$ divisions, $(2n^3+3n^2-5n)/6$ multiplications, and $(2n^3+3n^2-5n)/6$ subtractions for a total of approximately $2n^3/3$ operations with an arithmetic complexity of $O(n^3)$. While highly reliable, the arithmetic complexity of $O(n^3)$ is cost prohibitive for systems with millions of equations as in such applications, for example, as modern network security and large scale physical simulations.

The description provided in the background section should not be assumed to be prior art merely because it is mentioned in or associated with the background section. The background section may include information that describes one or more aspects of the subject technology.

SUMMARY

The disclosed system provides for accelerating Gaussian Elimination in solving systems of linear equations. In particular, the disclosed system provides for solving systems of linear equations by accelerating Gaussian Elimination using a vector matrix multiplication accelerator while representing coefficients of the linear systems in non-volatile storage elements of the vector matrix multiplication accelerator. The vector matrix multiplication accelerator performs the three row operations of Gaussian Elimination in a manner that reduces the arithmetic complexity for solving systems of linear equations.

According to certain aspects of the present disclosure, a method for solving systems of linear equations via utilization of a vector matrix multiplication accelerator is provided. The method includes receiving, from a controller and by the vector matrix multiplication accelerator, an augmented coefficient matrix comprising n rows by m columns. The method further includes implementing Gaussian Elimination using the vector matrix multiplication accelerator. Implementing Gaussian Elimination using the vector matrix multiplication accelerator includes monitoring, by a register in at least one swap operation, a row order of the augmented coefficient matrix when a first row of the augmented coefficient matrix is swapped with a second row of the augmented coefficient matrix. Implementing Gaussian Elimination further includes delivering, by the controller in at least one multiply operation, an analog voltage corresponding to a non-zero number to a desired row of the augmented coefficient matrix to produce a multiplication result vector. The implementing of Gaussian Elimination further includes adding, in at least one add operation, the first row of the augmented coefficient matrix to another desired row of the augmented coefficient matrix to produce an add result vector.

According to further aspects of the present disclosure, a system for solving systems of linear equations via utilization of an analog resistive memory crossbar array is provided. The system includes a memory having instructions. The system further includes one or more processors configured to execute the instructions to receive, from the one or more processors and by the analog resistive memory crossbar array, an augmented coefficient matrix comprising n rows by m columns. The one or more processors is further configured to execute the instructions to implement Gaussian Elimination on the augmented coefficient matrix using the vector matrix multiplication accelerator. Implementing Gaussian Elimination using the vector matrix multiplication accelerator includes monitoring, by a register in at least one swap operation, a row order of the augmented coefficient matrix when a first row of the augmented coefficient matrix is swapped with a second row of the augmented coefficient matrix. Implementing Gaussian Elimination further includes delivering, by the one or more processors in at least one multiply operation, an analog voltage corresponding to a non-zero number to a desired row of the augmented coefficient matrix to produce a multiplication result vector, and monitoring, by the one or more processors, a scaling of the multiplication result vector. The implementing of Gaussian Elimination further includes adding, in at least one add operation, the first row of the augmented coefficient matrix to another desired row of the augmented coefficient matrix to produce an add result vector. Implementing Gaussian Elimination further includes determining a final matrix in row echelon form.

According to further aspects of the present disclosure, a circuit is provided. The circuit includes a controller. The circuit further includes an analog resistive memory crossbar array configured to receive, from the controller, an augmented coefficient matrix comprising n rows by m columns. The controller is configured to deliver, in at least one multiply operation of Gaussian Elimination, an analog voltage corresponding to a non-zero number to a desired row of the augmented coefficient matrix to produce a multiplication result vector. The circuit further includes a register configured to monitor, in at least one swap operation of Gaussian Elimination, a row order of the augmented coefficient matrix when a first row of the augmented coefficient matrix is swapped with a second row of the augmented coefficient matrix, wherein the controller is configured to add, via the analog resistive memory crossbar array, in at least one add operation of Gaussian Elimination, the first row of the augmented coefficient matrix to another desired row of the augmented coefficient matrix to produce an add result vector.

According to further aspects of the present disclosure, a system for solving systems of linear equations via utilization of a vector matrix multiplication accelerator is provided. The system includes a means for receiving, from a controller, an augmented coefficient matrix comprising n row by m columns. The system further includes a means for implementing Gaussian Elimination. The means for implementing Gaussian Elimination also monitors a row order of the augmented coefficient matrix, in at least one swap operation, when a first row of the augmented coefficient matrix is swapped with a second row of the augmented coefficient matrix. The means for implementing Gaussian Elimination also delivers, in at least one multiply operation, an analog voltage corresponding to a non-zero number to a desired row of the augmented coefficient matrix to produce a multiplication result vector. The means for implementing Gaussian Elimination also adds, in at least one add operation, the first row of the augmented coefficient matrix to the multiplication result vector to produce an add result vector.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

General Overview

The disclosed system provides for solving systems of linear equations by accelerating Gaussian Elimination by utilizing a vector matrix multiplication accelerator and representing coefficients of the linear systems in non-volatile storage elements of the vector matrix multiplication accelerator.

The disclosed system provides an improvement to computer functionality by allowing computer performance of a function operated more efficiently. Specifically, the disclosed system provides for the vector matrix multiplication accelerator to perform the three row operations of Gaussian Elimination in a manner that improves computer performance by reducing the arithmetic complexity for solving systems of linear equations from $O(n^3)$ to $O(n)$ via implementation of Gaussian Elimination on the vector matrix multiplication accelerator.

Example System

Figure 1:
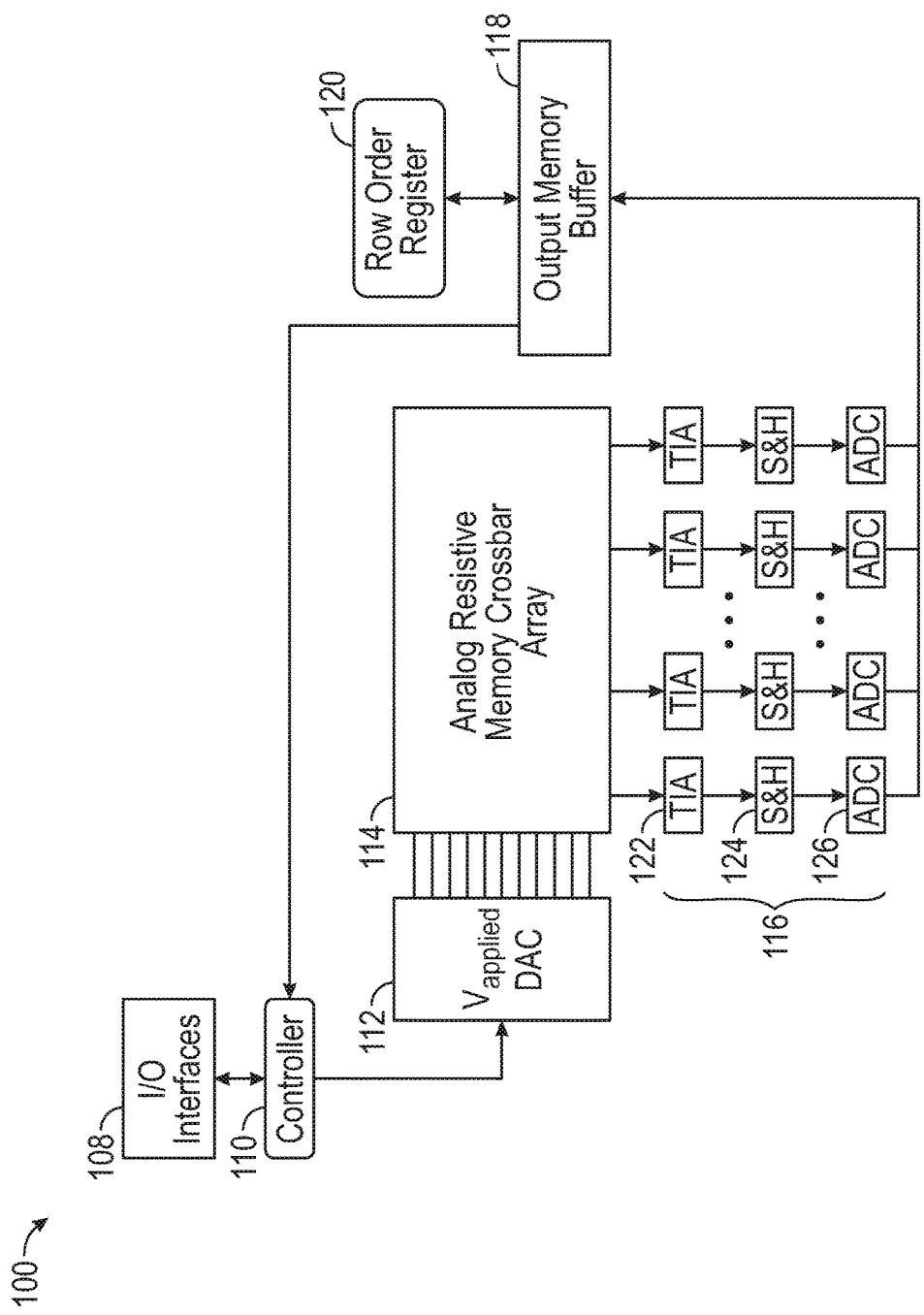
FIG. 1 illustrates an example vector matrix multiplication accelerator for solving systems of linear equations.

FIG. 1 illustrates an example vector matrix multiplication accelerator 100 for solving systems of linear equations. The vector matrix multiplication accelerator 100 includes input/output interfaces 108, such as one or more pin, wire, or connector. The vector matrix multiplication accelerator 100 also includes a controller 110, a digital-to-analog converter (DAC) 112, an analog resistive memory crossbar array 114, sense circuitry 116, an output memory buffer 118 (e.g., scratch memory), and a row order register 120. The controller 110 is configured to execute instructions physically coded into the controller 110, instructions received from software in memory accessed by the controller 110, or a combination of both. The controller 110 is configured to execute the instructions to program coefficients of linear systems of equations, converted as an augmented coefficient matrix, into the analog resistive memory crossbar array 114 via the DAC 112 and implement Gaussian Elimination on the augmented coefficient matrix for solving the linear systems of equations. The controller 110 communicates with a processor (402) via the input/output interfaces 108 and a bus (408) to receive the augmented coefficient matrix from the processor (402) and to return a transformed augmented coefficient matrix in row echelon form or reduced row echelon form to the processor (402).

The controller 110 is also configured to execute the instructions to monitor and store output of the analog resistive memory crossbar array 114, via the sense circuitry 116, in at least the output memory buffer 118, the row order register 120, and the analog resistive memory crossbar array 114. The sense circuitry 116 is configured to convert an electrical current output of the analog resistive memory crossbar array 114 to a voltage and, in certain aspects, includes a transimpedance amplifier 122, a sample-and-hold circuit 124, and an analog-to-digital converter (ADC) 126. The sense circuitry 116 can be arranged to represent a virtual ground to establish a reference point for read operations of the voltage outputs of the analog resistive memory crossbar array 114.

Moreover, the controller 110 is configured to execute the instructions to implement at least the functionality of applying a number of first voltages to a corresponding number of row lines within the analog resistive memory crossbar array 114 to change the values of a corresponding number of resistive memory elements located at junctions between the row lines and a number of column lines, as described in more detail below. The controller 110 is also configured to execute instructions to implement at least the functionality of collecting and monitoring output voltages converted from currents from column lines, which represent a dot product result, as will also be described in more detail below.

Figure 2:
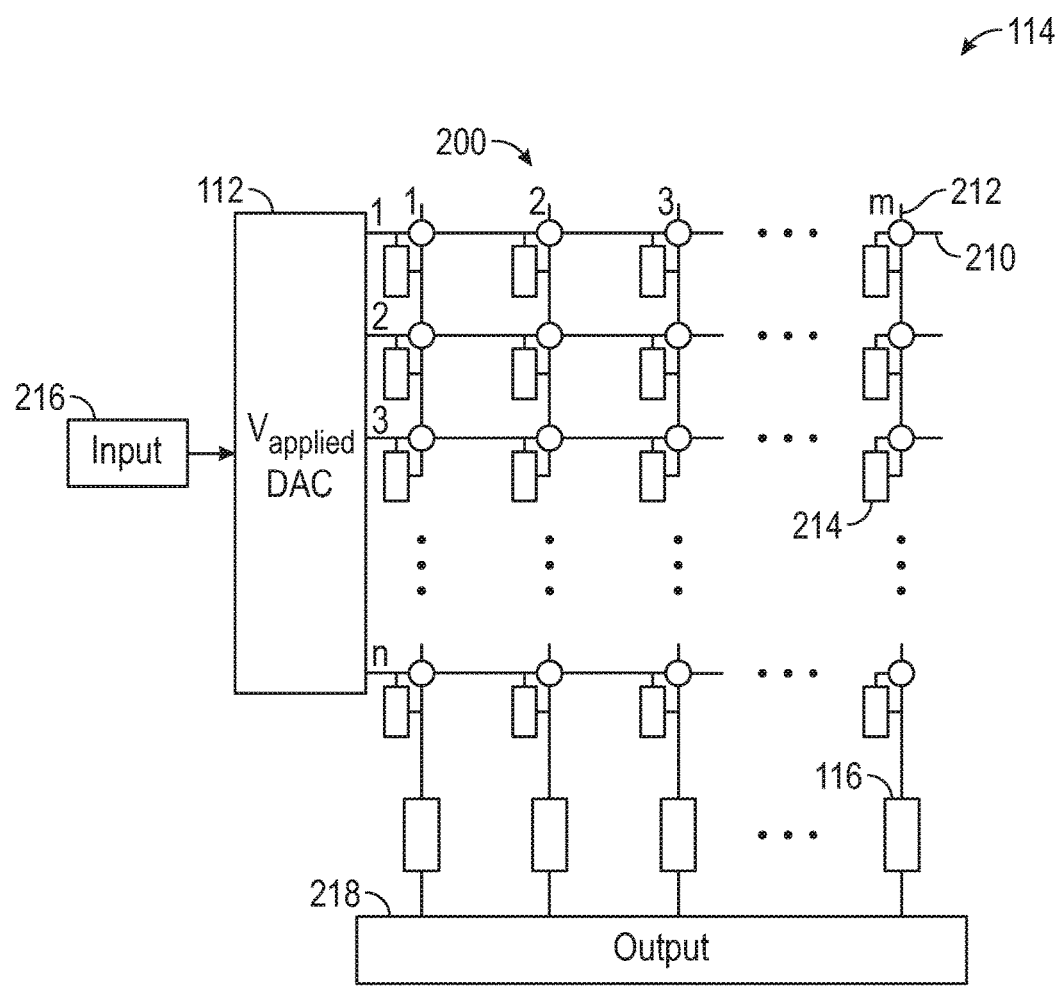
FIG. 2 is a diagram illustrating an example analog resistive memory crossbar array of FIG. 1, according to certain aspects of the disclosure.

FIG. 2 illustrates the analog resistive memory crossbar array 114 of FIG. 1. The analog resistive memory crossbar array 114 is, for example, a dot product engine 200 including n row electrodes 210 and m column electrodes 212. Each crossbar junction throughout the analog resistive memory crossbar array 114 includes a resistive memory element 214. The resistive memory element 214 should be broadly interpreted to include resistive random-access memory (RRAM) elements, phase-change random-access memory (PCRAM), magnetoresistive random-access memory (MRAM), and memristive memory elements including, but not limited to, a memristor, a memristor and selector, or a memristor and transistor in series. The resistive memory element 214 is configured to limit the flow of current in a reprogrammable manner based on the application of a voltage, a current, a fixed amount of charge, a magnetic field, or an elevated local temperature. The resistive memory element 214 retains its state once the voltage, current, charge, magnetic field, or elevated temperature is removed, and can be set to a wide range of conductance values.

The analog resistive memory crossbar array 114 includes an input 216 with n input voltages for applying or programming voltages to the row electrodes 210 via the DAC 112. The analog resistive memory crossbar array 114 also includes an output 218 with m output voltages resulting from converted current flows in the column electrodes 212 via the sense circuitry 116. The controller 110 is configured to apply or program the resistive memory elements 214 in the analog resistive memory crossbar array 114 so as to map the mathematic values of the input 216, such as the augmented coefficient matrix of n rows by m columns, to the analog resistive memory crossbar array 114. The controller 110 is configured to map or apply a matrix of values $[a_{ij}]$, such as the augmented coefficient matrix, onto the analog resistive memory crossbar array 114 where the resistive memory elements 214 include a conductance $G_{ij}$. As an example, the conductance value $G_{2,3}$ is set by applying a voltage equal to $V_{Row2}$ at the second row of the row electrodes 210 and a voltage equal to $V_{COL3}$ at the third column of the column electrodes 212. It should be noted that the resistive memory element 214 cannot be set to zero and, as such, will include some offset value in conductance. For example, the analog resistive memory crossbar array 114 can be used to perform vector matrix multiplication in situ. Through Ohm's Law and Kirchhoff's Law, applying a voltage vector $V_i$ along the rows to the conductance matrix $G_{ij}$ results in the measured current vector output $I_j = \Sigma_i G_{ij} * V_i$.

Referring to FIGS. 1 and 2, with the augmented coefficient matrix programmed onto the analog resistive memory crossbar array 114, the controller 110 is configured to implement Gaussian Elimination on the augmented coefficient matrix to solve the corresponding linear systems of equations. In a standard implementation of Gaussian Elimination on a system of n equations for n unknowns, performing row operations on the augmented coefficient matrix until it is in row echelon form and then solving for each unknown has an arithmetic complexity of $O(n^3)$. With the vector matrix multiplication accelerator 100, the implementation of Gaussian Elimination involves modifying the augmented coefficient matrix with row operations, including swap operations, multiply operations, and add operations, until the augmented coefficient matrix is transformed into a final matrix in row echelon form. For example, vector matrix multiplication can be performed via the analog resistive memory crossbar array 114 by applying a voltage vector $V_i$, of length n, to the matrix $G_{ij}$, of size n×n, and by determining or collecting the vector multiplication result $I_j$, which performs $n^2$ multiplications and $n(n-1)$ additions in a single step and, thus, $O(n^2)$ computations in a single step. Because the vector matrix multiplication accelerator 100 performs $O(n^2)$ computations in a single step, the arithmetic complexity is reduced to $O(n)$.

With the augmented coefficient matrix programmed onto the analog resistive memory crossbar array 114 and the row order register 120 configured to monitor the row order of the programmed augmented coefficient matrix, the controller 110 implements Gaussian Elimination using the vector matrix multiplication accelerator 100 by performing row operations including (1) row swap operations, (2) multiply operations (e.g., scaling operation), and (3) add operations. The controller 110 is configured to monitor the row order stored in the row order register 120 and, based on the row order and the augmented matrix values, determines to implement one of the three steps of Gaussian Elimination on the augmented coefficient matrix as the next step towards arriving at row echelon form. For example, the controller 110 is configured to determine a first non-zero entry in the analog resistive memory crossbar array 114. The controller 110 is configured to do so by first searching the first column, from the first row to the nth row, of the analog resistive memory crossbar array 114. In the case that the first column does not contain a non-zero entry, the controller 110 will then search the second column, from the first row to the nth row, of the analog resistive memory crossbar array 114 and will continue to search each successive column until a non-zero entry, which is referred to as the current pivot, is found. If the controller 110, however, determines the current pivot to be in a row other than the first row, then the row containing the current pivot is swapped with the first row such that the controller 110 updates the row order register 120 for monitoring the row order of the augmented coefficient matrix. In such swap operations, the controller 110 utilizes the row order register 120 to perform and monitor the new row order without involving any reprogramming of the conductance values in the analog resistive memory crossbar array 114. If the controller 110 determines the current pivot is in the first row, then a row swap operation is not necessary.

With the row containing the current pivot in the first row, the controller 110 is configured to, in instances when implemented to return the augmented coefficient matrix in reduced row echelon form, scale (e.g., multiply operation) a desired row of the augmented coefficient matrix. It should be understood that when the controller 110 is implemented to return the augmented coefficient matrix in row echelon form instead of reduced row echelon form, this multiplication operation may not be necessary. The multiply operation is performed when a leading coefficient (e.g., the first non-zero entry in a row) of the desired row is not equal to 1 and the other entries in the desired row are zero. As a result, the desired row is scaled with an appropriate non-zero value to transform the leading coefficient to 1 (e.g., transform to reduced row echelon form). For example, the controller 110 is configured to apply or deliver a non-zero analog voltage to a desired row. The controller 110 is configured to apply or deliver the non-zero analog voltage to the desired row by activating only the desired row. For example, the controller 110 is configured to deliver the input 216 to include only one non-zero value that corresponds to the desired row while all other rows on the input 216 (e.g., $V_{applied}$) are set to zero. Depending on the read scheme and parameters of the TIA 122 of the sense circuitry 116, all the other rows will be grounded or float. Therefore, for a column j, the result is $I_j = G_{ij} * V_{applied}$ (e.g., only single contribution for each column). The current output, which is converted to voltage by the TIA 122 and further converted to a digital value by the ADC 126, is a new G value (e.g., new row) or multiplication result vector, which is stored in memory 118 associated with the controller 110 such that the updated matrix towards arriving at row echelon form is effectively a combination of the input 216, the row order register 120, and the original programmed augmented coefficient matrix. In other words, the result of the read operation is the set of coefficients $G_{ij}$ of row i scaled by the input value $V_i$. The multiplication result vector may be monitored by the controller 110 to determine the next algorithmic step to take by evaluating whether the transformed augmented coefficient matrix has reached reduced row echelon form.

Delivering the input 216 to include only one non-zero value that corresponds to the desired row while all other rows on the input 216 are set to zero (e.g., multiply operation) includes an arithmetic complexity of O(m) multiplications in a single step.

In an example implementation, the controller 110 is configured to add (or subtract) appropriate multiples of the first row to (or from) all the other rows to obtain all zeros in the first column below, as arranged with respect to the row ordering stored in the row order register 120, the current pivot. In this add operation, the controller 110 is configured to only activate two rows while all other rows on the input 216 (e.g., $V_{applied}$) are set to zero. The result of such an operation is $\{I_j\}=\{G_{ij}*V_i+G_{kj}*V_k\}$, where i and k are the two rows being combined, where for example, the scaling voltage is applied to row i (e.g., the row containing the current pivot) and a voltage corresponding to "1" for adding or to "−1" for subtracting (e.g., the DAC output for "1" or "−1" as an input) is applied to row k. For example, the controller 110 is configured to deliver a first non-zero analog voltage to a desired row and deliver a second non-zero analog voltage (e.g., the second non-zero analog voltage includes an opposite sign as the first non-zero analog voltage for a subtraction operation and the second non-zero analog voltage includes a same sign as the first non-zero analog voltage for addition) to a desired adder/subtractor row. The current output, which is converted to voltage by the TIA 122 and further converted by the ADC 126, is an add result vector, which can either be stored in scratch memory, such as the output memory buffer 118, for use in determining the final matrix version or rewritten into the analog resistive memory crossbar array 114 (e.g., at row $G_i(1:m)$) when it is early in the Gaussian Elimination process and depending on algorithm implementation and size of the array. For example, the controller 110 is configured to, during any row operation required to be performed on the add result vector, retrieve the add result vector stored in the scratch memory, such as the output memory buffer 118, and perform the desired row operation digitally.

The add operation includes an arithmetic complexity of O(m) multiplications and an arithmetic complexity of O(m) additions/subtractions.

Once the controller 110 determines that the first column includes all zeros below the row containing the current pivot, the controller is configured to perform any of the three row operations in a similar manner on the submatrix consisting of all the elements which are below and to the right of the current pivot and so on until the augmented coefficient matrix is in row echelon form. Moreover, as Gaussian Elimination is performed on the augmented coefficient matrix, the various transformations of the augmented coefficient matrix towards arriving at row echelon form, or updated matrix, includes at least a combination of the original augmented coefficient matrix programmed onto the analog resistive memory crossbar array 114, the row order register 120, and the input 216 (e.g., $V_{applied}$). If the add result vector is not rewritten onto the analog resistive memory crossbar array 114, then the output memory buffer 118 storing the updated $G_{ij}$ rows is also included in defining the updated matrix as well. While the above describes an exemplary manner in which the augmented coefficient matrix arrives at row echelon form, it is to be understood that the controller 110 of the vector matrix multiplication accelerator 100 is configured to transform the augmented coefficient matrix into row echelon form by performing any other various orderings of the three row operations.

Implementing Gaussian Elimination using the vector matrix multiplication accelerator 100 includes monitoring, by a register in at least one swap operation, a row order of the analog input voltage matrix when a first row of the augmented coefficient matrix is swapped with a second row of the augmented coefficient matrix. The implementation of Gaussian Elimination also includes delivering, by the controller in at least one multiply operation, an analog voltage corresponding to a non-zero number to a desired row of the augmented coefficient matrix to produce a multiplication result vector. The implementation of Gaussian Elimination further includes adding, in at least one add operation, the first row of the augmented coefficient matrix to the multiplication result vector to produce an add result vector.

In certain further aspects, in the at least one add operation, the first row of the augmented coefficient matrix and the multiplication result vector are stored in a buffer such as when the augmented coefficient matrix is nearly transformed to either row echelon form or reduced row echelon form. For example, the first row of the augmented coefficient matrix may be the result of a previous multiplication operation and is stored in the buffer for further row operations, such as being added to the multiplication result vector also stored in the buffer. The controller 110 is configured to retrieve the first row of the augmented coefficient matrix and the multiplication result vector from the buffer to perform the add operation digitally.

In certain other aspects, in the at least one add operation, the first row of the augmented coefficient matrix is another multiplication result vector. As Gaussian Elimination may require multiple row operations, the first row of the augmented coefficient matrix may be the result of a previous multiplication operation.

In still other certain aspects, in the at least one add operation, the add result vector is stored in the buffer. The add result vector is stored in the buffer for further row operations, if necessary to complete Gaussian Elimination.

In still further certain aspects, in the at least one add operation, the add result vector is stored in the analog resistive memory crossbar array. This is accomplished by reprogramming of the elements in the corresponding row of the resistive memory crossbar array to a new set of analog conductance values through the application of positive or negative voltage or current pulses.

In further certain aspects, the final matrix is stored in the buffer. The buffer includes reprogrammable digital memory elements such as, but not limited to, SRAM (static random-access memory), DRAM (dynamic random-access memory), or flash memory.

In other certain aspects, the final matrix is stored in the analog resistive memory crossbar array. This is accomplished by reprogramming of the elements of the crossbar array to a new set of analog conductance values through the application of positive or negative voltage or current pulses.

The techniques described herein may be implemented as method(s) that are performed by physical computing device (s); as one or more non-transitory computer-readable storage media storing instructions which, when executed by computing device(s), cause performance of the method(s); or, as physical computing device(s) that are specially configured with a combination of hardware and software that causes performance of the method(s).

Figure 3:
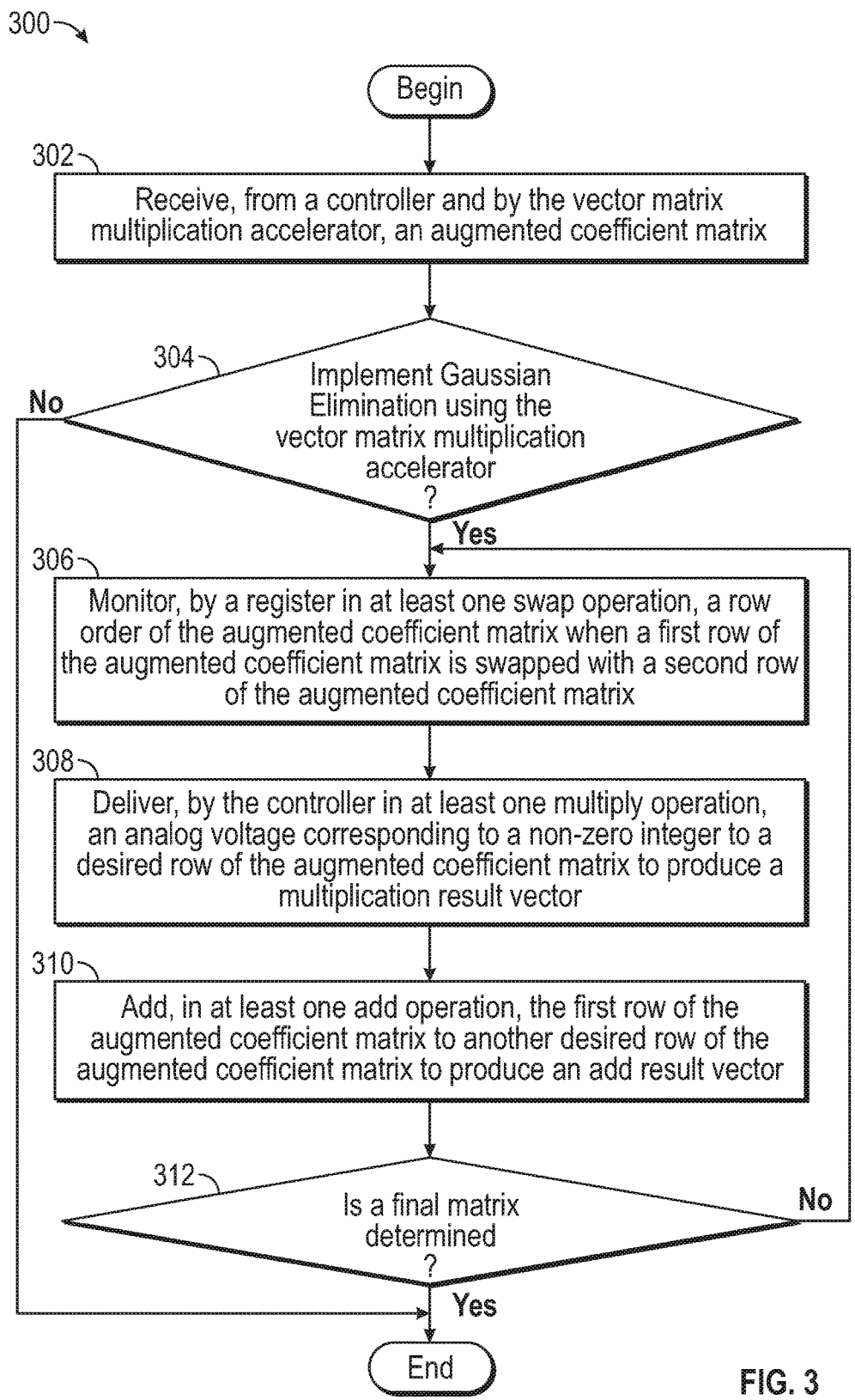
FIG. 3 illustrates an example process for solving systems of linear equations via utilization of a vector matrix multiplication accelerator using the example client/server of FIG. 2.

FIG. 3 illustrates an example process 300 for solving systems of linear equations via utilization of a vector matrix multiplication accelerator 100 of FIG. 1. While FIG. 3 is described with reference to FIG. 1, it should be noted that the process steps of FIG. 3 may be performed by other systems.

The process 300 begins by proceeding to step 302 when the analog resistive memory crossbar array 114 of the vector matrix multiplication accelerator 100 receives an augmented coefficient matrix comprising n rows by m columns from a controller 110. The augmented coefficient matrix is an augmented matrix of coefficients of linear systems of equations. Next, in step 304, it is determined whether Gaussian Elimination is required to be implemented on the augmented coefficient matrix using the vector matrix multiplication accelerator. When it is determined that Gaussian Elimination is not required, the process 300 proceeds to the end. When it is determined that Gaussian Elimination is required, on the other hand, the process 300 proceeds to steps 306 to 310, which illustrate the row operations performed during the implementation of Gaussian Elimination. It should be understood that steps 306 to 310 are not illustrated in any particular order and that some steps may not be performed at all while other steps may be performed multiple times. In step 306, in at least one swap operation, a register monitors a row order of the augmented coefficient matrix when a first row of the augmented coefficient matrix is swapped with a second row of the augmented coefficient matrix. In particular, the controller 110 is configured to update the register (e.g., the row order register 120) with the new row order and monitor the new row order in the register.

In step 308, in at least one multiply operation, a controller 110 delivers an analog voltage corresponding to a non-zero number to a desired row of the augmented coefficient matrix to produce a multiplication result vector. In particular, the controller 110 is configured to monitor the multiplication result vector, which is effectively stored in memory 118 associated with the controller 110 such that the updated matrix towards arriving at row echelon form is effectively a combination of the received (e.g., programmed) augmented coefficient matrix, the row order register 120, and the delivered analog voltage (e.g., the input 216), to determine the next algorithmic step to take by evaluating whether the transformed augmented coefficient matrix has reached reduced row echelon form. In step 310, in at least one add operation, a controller 110 via an analog resistive memory array 114 adds the first row of the augmented coefficient matrix to another desired row of the augmented coefficient matrix to produce an add result vector. In particular, the add result vector can either be stored in scratch memory, such as the output memory buffer 118, for the controller to use or monitor in determining the final matrix version in row echelon form or rewritten into the analog resistive memory crossbar array.

At step 312, the controller 110 determines whether a final matrix is in row echelon form by monitoring a combination of at least the original augmented coefficient matrix programmed onto the analog resistive memory crossbar array 114, the row order register 120, and the input 216. If no, the process returns to step 306 to repeat the row operations as required. If the final matrix is in row echelon form, then the process 300 ends.

Hardware Overview

Figure 4:
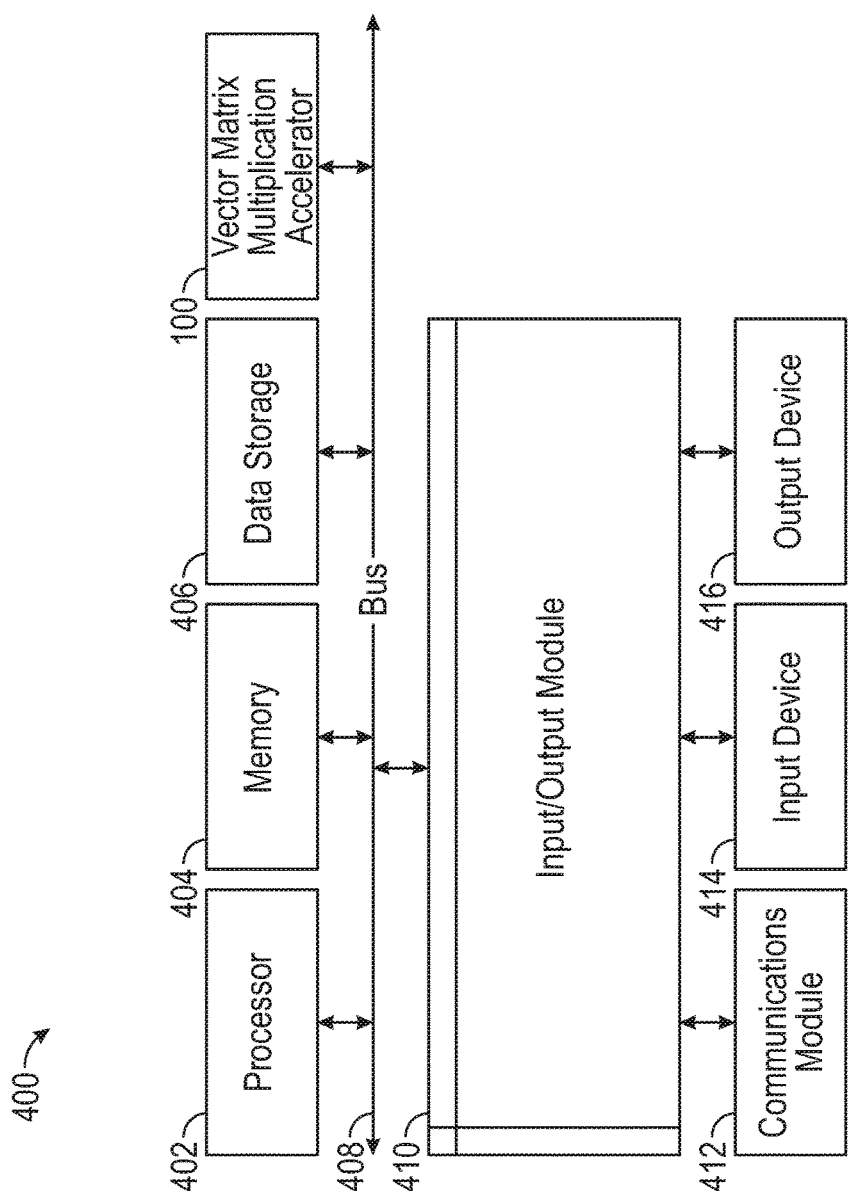
FIG. 4 is a block diagram illustrating an example computer system with which the vector matrix multiplication accelerator of FIG. 1 can be implemented.

FIG. 4 is a block diagram illustrating an example computer system 400 with which the vector matrix multiplication accelerator 100 can be implemented. In certain aspects, the computer system 400 may be implemented using hardware or a combination of software and hardware, either in a dedicated server, or integrated into another entity, or distributed across multiple entities.

Computer system 400 includes a bus 408 or other communication mechanism for communicating information, and a processor 402 (e.g., controller 110) coupled with bus 408 for processing information. The computer system 400 also includes the vector matrix multiplication accelerator 100, which is coupled to the processor 402 via the bus 408.

According to one aspect, the computer system 400 can be a cloud computing server of an IaaS that is able to support PaaS and SaaS services. According to one aspect, the computer system 400 is implemented as one or more special-purpose computing devices. The special-purpose computing device may be hard-wired to perform the disclosed techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices, or any other device that incorporates hard-wired and/or program logic to implement the techniques. By way of example, the computer system 400 may be implemented with one or more processors 402. Processor 402 may be a general-purpose microprocessor, a microcontroller, a reduced instruction set computer (RISC), a Digital Signal Processor (DSP), an ASIC, an FPGA, a Programmable Logic Device (PLD), a controller, a state machine, gated logic, discrete hardware components, or any other suitable entity that can perform calculations or other manipulations of information.

Computer system 400 can include, in addition to hardware, code that creates an execution environment for the computer program in question, e.g., code that constitutes processor firmware, a protocol stack, a database management system, an operating system, or a combination of one or more of them stored in an included memory 404, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 408 for storing information and instructions to be executed by processor 402. The processor 402 and the memory 404 can be supplemented by, or incorporated in, special purpose logic circuitry. Expansion memory may also be provided and connected to computer system 400 through input/output module 410, which may include, for example, a SIMM (Single In Line Memory Module) card interface.

The instructions may be stored in the memory 404 and implemented in one or more computer program products, e.g., one or more modules of computer program instructions encoded on a computer readable medium for execution by, or to control the operation of, the computer system 400, and according to any method well known to those of skill in the art. Memory 404 may also be used for storing temporary variable or other intermediate information during execution of instructions to be executed by processor 402.

Computer system 400 further includes a data storage device 406 such as a magnetic disk or optical disk, coupled to bus 408 for storing information and instructions. Computer system 400 may be coupled via input/output module 410 to various devices. The input/output module 410 can be any input/output module.

The components of the system can be interconnected by any form or medium of digital data communication, e.g., a communication network. The communication network (e.g., communication network 150) can include, for example, any one or more of a personal area network (PAN), a local area network (LAN), a campus area network (CAN), a metropolitan area network (MAN), a wide area network (WAN), a broadband network (BBN), the Internet, and the like.

In certain aspects, communications module 412 can provide a two-way data communication coupling to a network link that is connected to a local network. Wireless links and wireless communication may also be implemented. In any such implementation, communications module 412 transmits and receives electrical, electromagnetic, or optical signals that carry digital data streams representing various types of information. The network link typically provides data communication through one or more networks to other data devices.

Computer system 400 can transmit messages and receive data, including program code, through the network(s), the network link, and communications module 412. In the Internet example, a server might transmit a requested code for an application program through Internet, the ISP, the local network, and communications module 412. The received code may be executed by processor 402 as it is received, and/or stored in data storage 406 for later execution.

In certain aspects, the input/output module 410 is configured to connect to a plurality of devices. Example input devices 414 include a keyboard and a pointing device, e.g., a mouse or a trackball, by which a user can provide input to the computer system 400. Example output devices 416 include display devices, such as a LED (light emitting diode), CRT (cathode ray tube), LCD (liquid crystal display) screen, a TFT LCD (Thin-Film-Transistor Liquid Crystal Display) or an OLED (Organic Light Emitting Diode) display, for displaying information to the user. The output device 416 may comprise appropriate circuitry for driving the output device 416 to present graphical and other information to a user.

According to one aspect of the present disclosure, the vector matrix multiplication accelerator 100 can be implemented using a computer system 400 in response to processor 402 executing one or more sequences of one or more instructions contained in memory 404. Such instructions may be read into memory 404 from another machine-readable medium, such as data storage device 406. Execution of the sequences of instructions contained in main memory 404 causes processor 402 to perform the process steps described herein. One or more processors in a multi-processing arrangement may also be employed to execute the sequences of instructions contained in memory 404. Processor 402 may process the executable instructions and/or data structures by remotely accessing the computer program product, for example by downloading the executable instructions and/or data structures from a remote server through communications module 412 (e.g., as in a cloud-computing environment). In alternative aspects, hard-wired circuitry may be used in place of or in combination with software instructions to implement various aspects of the present disclosure. Thus, aspects of the present disclosure are not limited to any specific combination of hardware circuitry and software.

Computer system 400 can be, for example, and without limitation, a desktop computer, laptop computer, or tablet computer. Computer system 400 can also be embedded in another device, for example, and without limitation, a mobile telephone, and a personal digital assistant (PDA).

The term "machine-readable storage medium" or "computer-readable medium" as used herein refers to any medium or media that participates in providing instructions or data to processor 402 for execution. The term "storage medium" as used herein refers to any non-transitory media that store data and/or instructions that cause a machine to operate in a specific fashion. Such a medium may take many forms, including, but not limited to, non-volatile media, volatile media, and transmission media. Non-volatile media include, for example, optical disks, magnetic disks, or flash memory, such as data storage device 406. Volatile media include dynamic memory, such as memory 404. Transmission media include coaxial cables, copper wire, and fiber optics, including the wires that comprise bus 408. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

In one aspect, a method may be an operation, an instruction, or a function and vice versa. In one aspect, a clause or a claim may be amended to include some or all of the words (e.g., instructions, operations, functions, or components) recited in other one or more clauses, one or more words, one or more sentences, one or more phrases, one or more paragraphs, and/or one or more claims.

To illustrate the interchangeability of hardware and software, items such as the various illustrative blocks, modules, components, methods, operations, instructions, and algorithms have been described generally in terms of their functionality. Whether such functionality is implemented as hardware, software, or a combination of hardware and software depends upon the particular application and design constraints imposed on the overall system. Skilled artisans may implement the described functionality in varying ways for each particular application.

As used herein, the phrase "at least one of" preceding a series of items, with the terms "and" or "or" to separate any of the items, modifies the list as a whole, rather than each member of the list (e.g., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

Terms such as "top," "bottom," "front," "rear," and the like as used in this disclosure should be understood as referring to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference. Furthermore, to the extent that the term "include," "have," or the like is used in the description or the claims, such term is intended to be inclusive in a manner similar to the term "comprise" as "comprise" is interpreted when employed as a transitional word in a claim.

The word "exemplary" is used herein to mean "serving as an example, instance, or illustration." Any embodiment described herein as "exemplary" is not necessarily to be construed as preferred or advantageous over other embodiments. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." Pronouns in the masculine (e.g., his) include the feminine and neuter gender (e.g., her and its) and vice versa. The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for."

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter. The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A method for solving systems of linear equations via utilization of a vector matrix multiplication accelerator, the method comprising:
    receiving, from a controller and by the vector matrix multiplication accelerator, an augmented coefficient matrix comprising n rows by m columns; and
    implementing Gaussian Elimination using the vector matrix multiplication accelerator by:
        monitoring, by a register in at least one swap operation, a row order of the augmented coefficient matrix when a first row of the augmented coefficient matrix is swapped with a second row of the augmented coefficient matrix;

delivering, by the controller in at least one multiply operation, an analog voltage corresponding to a non-zero number to a desired row of the augmented coefficient matrix to produce a multiplication result vector; and adding, in at least one add operation, the first row of the augmented coefficient matrix to another desired row of the augmented coefficient matrix to produce an add result vector.

2. The method of claim 1, wherein, in the at least one add operation, the first row of the augmented coefficient matrix and the desired row of the augmented coefficient matrix are stored in a buffer.

3. The method of claim 2, wherein, in the at least one add operation, the first row of the augmented coefficient matrix is another multiplication result vector.

4. The method of claim 1, wherein, in the at least one add operation, the add result vector is stored in a buffer.

5. The method of claim 1, wherein, in the at least one add operation, the add result vector is stored in the vector matrix multiplication accelerator.

6. The method of claim 1, wherein the at least one multiply operation, further includes monitoring, by the controller, a scaling of the multiplication result vector.

7. The method of claim 1, wherein the vector matrix multiplication accelerator comprises an analog resistive memory crossbar array.

8. The method of claim 1, wherein implementing Gaussian elimination comprises determining a final matrix in row echelon form.

9. The method of claim 8, wherein the final matrix is stored in a buffer.

10. The method of claim 8, wherein the final matrix is stored in the vector matrix multiplication accelerator.

11. A system for solving systems of linear equations via utilization of an analog resistive memory crossbar array, the system comprising:

a memory comprising instructions; and one or more processors configured to execute the instructions to:

receive, from the one or more processors and by the analog resistive memory crossbar array, an augmented coefficient matrix comprising n rows by m columns; and implement Gaussian Elimination on the augmented coefficient matrix using the analog resistive memory crossbar array by:

monitoring, by a register in at least one swap operation, a row order of the augmented coefficient matrix when a first row of the augmented coefficient matrix is swapped with a second row of the augmented coefficient matrix;

delivering, by the one or more processors in at least one multiply operation, an analog voltage corresponding to a non-zero number to a desired row of the augmented coefficient matrix to produce a multiplication result vector, and monitoring, by the one or more processors, a scaling of the multiplication result vector;

adding, in at least one add operation, the first row of the augmented coefficient matrix to another desired row of the augmented coefficient matrix to produce an add result vector; and determining a final matrix in row echelon form.

12. The system of claim 11, wherein, in the at least one add operation, the first row of the augmented coefficient matrix and the multiplication result vector are stored in a buffer.

13. The system of claim 12, wherein, in the at least one add operation, the first row of the augmented coefficient matrix is another multiplication result vector.

14. The system of claim 11, wherein, in the at least one add operation, the add result vector is stored in a buffer.

15. The system of claim 11, wherein, in the at least one add operation, the add result vector is stored in the analog resistive memory crossbar array.

16. The system of claim 11, wherein the final matrix is stored in a buffer.

17. The system of claim 11, wherein the final matrix is stored in the analog resistive memory crossbar array.

18. A circuit, comprising:

a controller;

an analog resistive memory crossbar array configured to receive, from the controller, an augmented coefficient matrix comprising n rows by m columns, the controller configured to deliver, in at least one multiply operation of Gaussian Elimination, an analog voltage corresponding to a non-zero number to a desired row of the augmented coefficient matrix to produce a multiplication result vector; and a register configured to monitor, in at least one swap operation of Gaussian Elimination, a row order of the augmented coefficient matrix when a first row of the augmented coefficient matrix is swapped with a second row of the augmented coefficient matrix, wherein the controller is configured to add, via the analog resistive memory crossbar array, in at least one add operation of Gaussian Elimination, the first row of the augmented coefficient matrix to another desired row of the augmented coefficient matrix to produce an add result vector.

19. The circuit of claim 18, further including a buffer configured to store, in the at least one add operation of Gaussian Elimination, the add result vector.

20. The circuit of claim 18, further including at least one analog-to-digital converter configured to generate a digital multiplication result vector based on the multiplication result vector via at least one sample-and-hold circuit.

* * * * *